Fig. 1.

INVENTOR.
William Stern
BY
Moore, Olson & Trexler
attys

July 3, 1956 W. STERN 2,752,618
NUT AND WASHER ASSEMBLY MACHINE
Filed Oct. 11, 1951 6 Sheets-Sheet 3

INVENTOR.
William Stern
BY
Moore, Olson & Trexler
Attys.

July 3, 1956 W. STERN 2,752,618
NUT AND WASHER ASSEMBLY MACHINE
Filed Oct. 11, 1951 6 Sheets-Sheet 5

INVENTOR.
William Stern
BY
Moore Olson & Trexler
attys.

United States Patent Office 2,752,618
Patented July 3, 1956

2,752,618

NUT AND WASHER ASSEMBLY MACHINE

William Stern, Chicago, Ill., assignor to Illinois Tool Works, Chicago, Ill., a corporation of Illinois Application October 11, 1951, Serial No. 250,865

5 Claims. (Cl. 10—155)

This invention is concerned generally with the assembly of washers and rotary fastening elements and particularly with the assembly of nut elements with non-symmetrical or flanged lock washers fed from a random mass.

Heretofore considerable difficulty has been encountered in attempting to feed toothed lock washers from a random mass in succession for assembly with rotary fastening elements. The washer teeth tend to become entangled to clump the washers together in the hopper and attempts to feed toothed lock washers down a chute or track heretofore have resulted in improper movement of the washers down the track due to entangling of teeth of adjacent washers and binding of the teeth along the chute or track edge. The problem of clumping washers in the hopper has been solved in this invention by the provision of an agitator having a spring member which is effective to separate the washers without deforming them. Feeding of individual toothed washers down a track has been perfected, in the case of washers having projections from the plane of the body, herein generally termed flanged lock washers, by the provision of a longitudinally inclined and transversely tilted track having a guiding edge along which the washer flanges roll and slide with the teeth ends free from contact with the edge of the track.

An object of this invention is to provide a new or improved method of and apparatus for feeding individual, flanged, toothed lock washers from a random mass in succession down a chute or track for assembly with nut elements.

A further object of this invention is to provide a method of and apparatus for feeding individual, flanged, toothed lock washers down a chute or track with the washer teeth free from contact with the edge of the chute or track.

A more specific object of this invention is to provide a means for and method of feeding individual, flanged, toothed lock washers down a track or chute by sliding or rolling the washers with the rim or flange along the edge of the chute or track.

An object of this invention is to provide a resilient agitator for inhibiting the formation of clumps and for breaking up clumps of toothed lock washers in a hopper.

Another object of this invention is to provide, in an apparatus for assembling individual, flanged, toothed lock washers and nut elements, means for feeding such lock washers one by one into successive recesses of a continuously moving carrier for assembly with nut elements.

A further object is to provide improved mechanism for orienting recessed nut elements with the recesses in a given direction.

Another object is to provide an improved nut element feeding mechanism of simplified construction for feeding nut elements one by one into the recesses of a carrier.

Still another object is to provide an improved mechanism for telescoping nut elements and washers.

Other and further objects and advantages of the present invention will be apparent from the following description when taken in connection with the accompanying drawings wherein.

Figure 1:
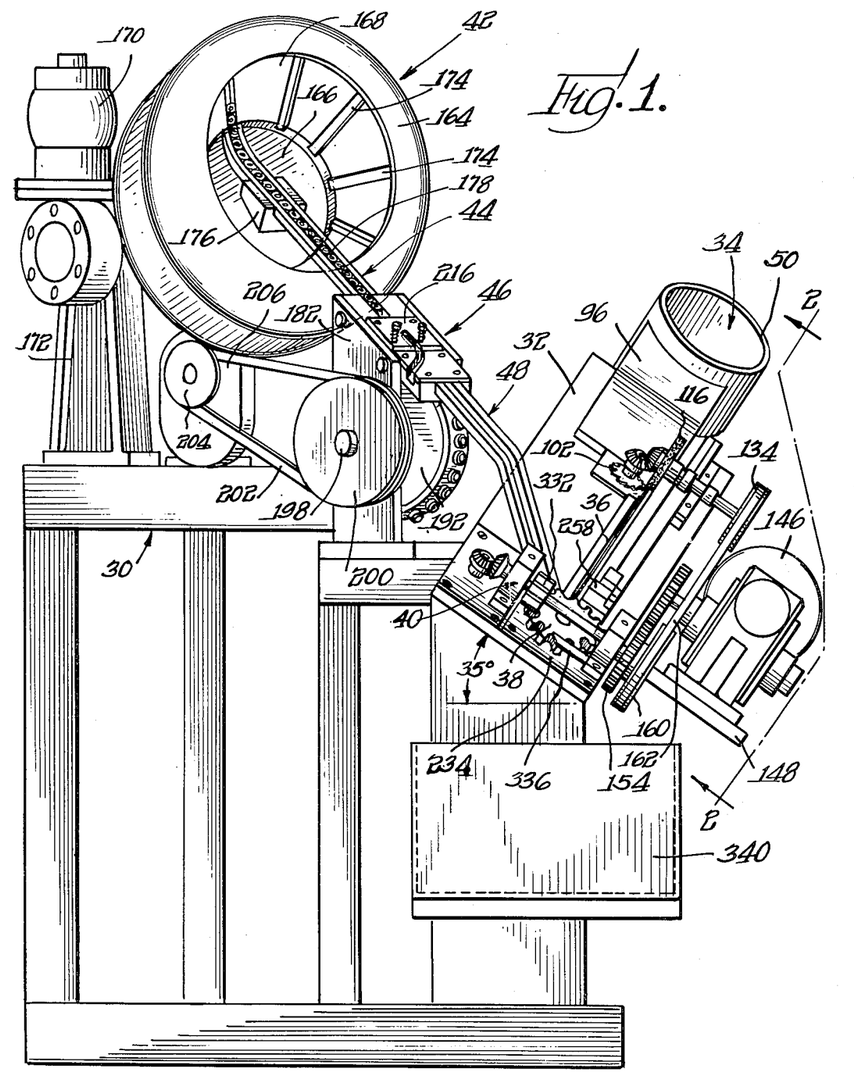
Fig. 1 is a side view of an assembly machine embodying the principles of my invention.
Figures 2, 4:
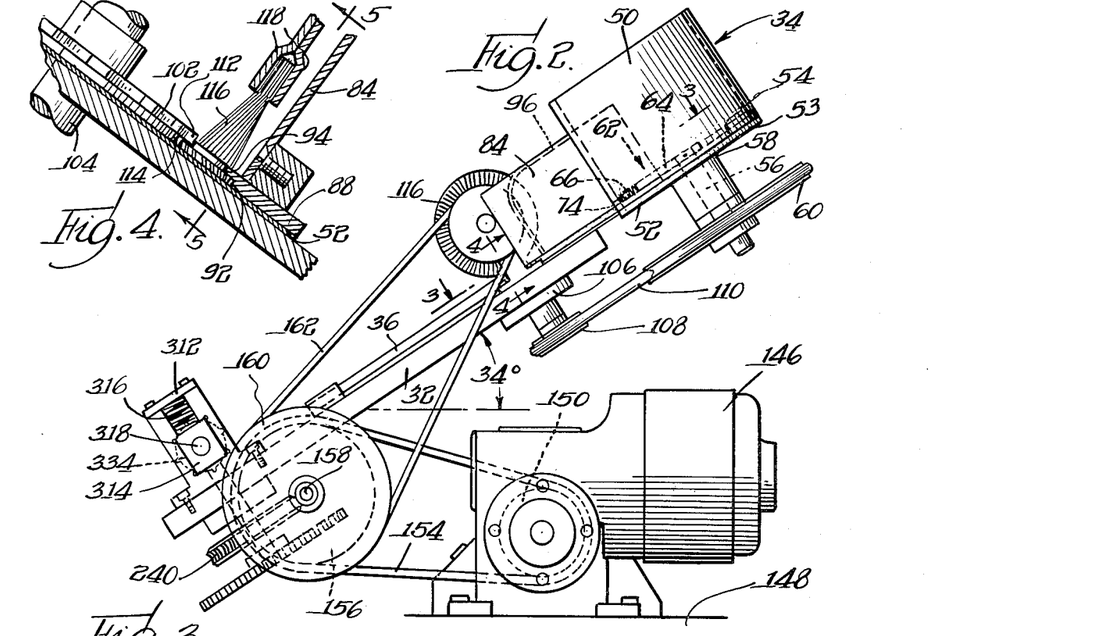
Fig. 2 is a side view of a portion of the machine as taken along the line 2—2 of Fig. 1.
Fig. 4 is a sectional view taken along the line 4—4 of Fig. 2.

Referring first to Fig. 1 for a general understanding of the invention, an assembly machine embodying the principles of the invention may be seen to comprise a base 30 on which is fixed washer supply mechanism including a plate or table 32 longitudinally inclined and transversely tilted. Specifically, the plane of the table forms an angle of substantially 34° with the horizontal as indicated in Fig. 2, and the transverse dimension forms an angle of substantially 35° with the horizontal as indicated in Fig. 1. These angles may vary slightly but are of utmost importance in feeding individual, flanged, toothed lock washers as will be brought out hereinafter.

A washer hopper 34 is located near the upper end of the plate 32 and a washer track 36 carried by the plate 32 leads downwardly therefrom longitudinally of the plate to an assembly mechanism including a wheel or disc 38.

A telescoping mechanism 40 is positioned adjacent the assembly wheel and in part overlies the periphery of the wheel.

Nut supply mechanism including a nut hopper 42 is supported on the base 30 for supplying nuts through a nut feeder, track or chute 44 to a nut selector 46 with either face up. The nuts are of the countersunk or other recessed type and those which have their recesses in the lower faces as they pass through the nut selector 46 continue down a chute 48 to the assembly wheel or disc 38 for assembly with washers from the chute or track 36. Those having the recesses in the upper faces are dropped back into the hopper.

*The washer supply mechanism*

The washer hopper 34 comprises a cylindrical drum 50 (Figs. 1–3 and 6) supported by a plate 52 secured on the upper edge of the table or plate 32 with the axis of the cylinder perpendicular to the face of the plate or table 32. The cylinder 50 is closed at its lower edge by a stationary plate 53 above which is positioned a rotary plate 54. The plate 54 is keyed to a shaft 56 journalled in a suitable bearing or bearings in a hub 58 projecting from the bottom of the hopper. A pulley 60 is fixed on the lower end of the shaft 56 for rotating the shaft and the bottom 54.

A washer agitator 62 is fixed to the bottom 54 for rotation therewith and comprises a rod 64 having a tapered coil spring 66 on the outer end thereof. The tapered coil spring is effective to inhibit the formation of clumps of washers and to break up any clumps which form, and is capable of giving away enough to prevent deformation of the washers if there should be a momentary jam. The inner end of the rod 64 is fixed to a mounting block 68 having a plurality of slots 70 therein through which pass screws 72 threaded into the bottom 54. The screw-in-slot arrangement provides for adjustment to bring the spring 66 closer to or farther away from the cylindrical wall 50 of the hopper.

The drum 50 is provided with an arcuate aperture 74 having its lower edge on the same level as the rotary bottom 54 and of a height to allow one washer 76 of the type having a substantially axially directed rim or flange 78 (see Fig. 24 for a cross section of the washer) to pass through when lying flat. The aperture 74 is substantially at the lowest portion of the drum 50 and is aligned with the washer chute or track 36. One vertical side or edge 80, hereinafter referred to as the leading edge, is disposed very nearly radially of the cylindrical drum 50 while the other vertical edge 82, hereinafter called the trailing edge, of the slot forms a rather shallow angle with the tangent to the drum at the edge of the slot.

Figures 6, 7:
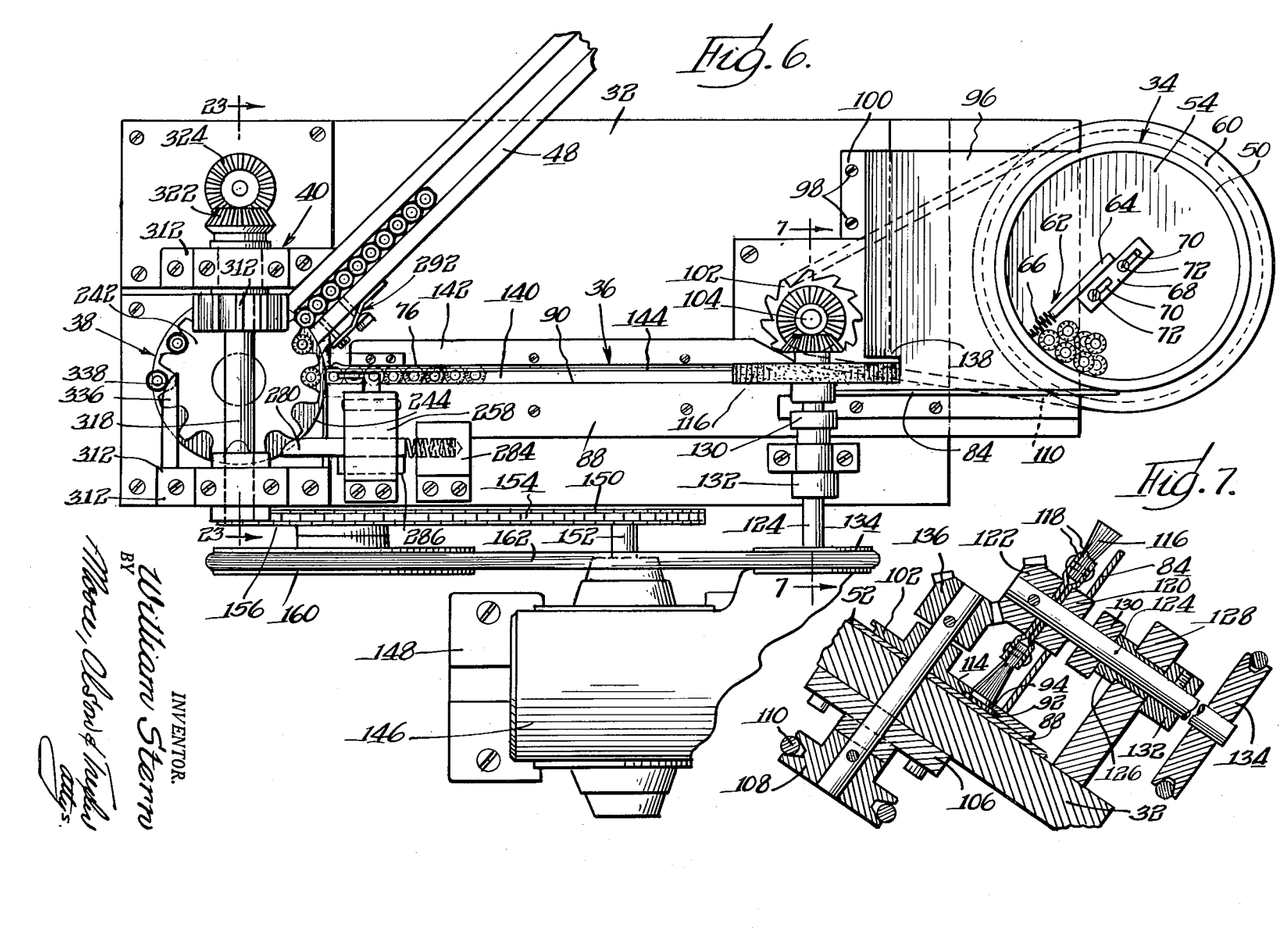
Fig. 6 is a top view of the portion of the machine shown in Fig. 2.
Fig. 7 is a sectional view taken along the line 7—7 of Fig. 6.

The plate 52 preferably has its top face on a level slightly below the top face of the rotary bottom 54 and the bottom of the slot 74 for receiving washers from the hopper 34 to prevent jamming by washers which might back up or collect on the surface of the plate 52 adjacent the aperture or slot 74. A plate 84 is arranged at right angles to the plate 52 and abuts or joins an arcuate plate 86 secured to the outside of the cylindrical drum 50 by means such as bolts 87. The arcuate plate 86 leaves room for only one washer at a time to pass between it and the leading edge 80 of the slot 74. The track 36 extends in the direction of the plate 84 in the plane of the plate 52 and comprises a spacer plate 88 fixed to the plate 52 and a metallic strip 90 suitably secured to the plate 88 and extending beyond the edge thereof so that the longitudinal edges 92 and 94 of the plate 88 and strip 90 are spaced apart laterally a distance slightly greater than the distance between the washer rims or flanges 78 and the tips of the washer teeth. The plate 88 and strip 90 may be integral if desired as shown in Figs. 4 and 7. The purpose of this construction as will be pointed out more fully hereafter is to allow the washer rims 78 to lie against the strip edge 94 with the washer teeth underlying the strip 90 and short of the plate edge 92. It should be borne in mind that the plate or table 32 and hence the plate 52 are tilted so as to cause washers on the plate 52 to lie against the edge 94 and proceed down the track 36 (to the left in Fig. 3) under the force of gravity.

A curved hood 96 extends upwardly from the plate 52 to which it is secured by means such as screws 98 (Fig. 6) passing through a flange 100 on the hood and has its upper edge fixed to the cylindrical wall 50 of the hopper 54 by any suitable means. The hood 96 and the wall 84 together form an enclosure for the washers on the plate 52.

A clearance wheel 102 (Figs. 1–7) lies against the top surface of the plate 52 and extends under the hood 56 through a cut out portion. The clearance wheel 102 is fixed to a shaft 104 for rotation therewith and the shaft 104 is rotatably journalled in plate or table 32 and in a bracket 106 secured on the under side of the table. A pulley 108 is fixed on the lower end of the shaft 104 and a belt 110 is passed over the pulley 104 and the pulley 60 for driving the rotary bottom 54 of the hopper.

The clearance wheel 102 is provided with teeth 112 spaced about its periphery. The tips of the teeth at their closest point of approach to the track edge 94 are spaced from this track edge just slightly greater than the diameter of the washer rims or flanges. The teeth are undercut at 114 to provide clearance for the washer teeth as may best be seen in Figs. 4 and 7.

A wire brush 116 overlies the track 36 at the closest approach of the clearance wheel 102 thereto. The wire brush 116 is clamped between end plates 118 which are riveted or otherwise suitably secured together and which are fixed between a collar 120 and a bevel gear 122 on a shaft 124 for rotation therewith. The shaft is journaled in a suitable sleeve bearing 126 mounted in a supporting post or block 128 upstanding from the plate or table 32. The shaft is secured against axial motion in the bearing by means of collars 130 and 132 pinned to the shaft on opposite sides of the bearing 126. A pulley 134 is fixed on the outer end of the shaft 124 for driving the shaft and the bevel gear 122 meshes with a bevel gear 136 on the clearance wheel shaft 104 for driving the clearance wheel. The wire brush 116 fits through a relieved portion 138 part way into the hood 96.

Figures 19, 20, 21, 22:
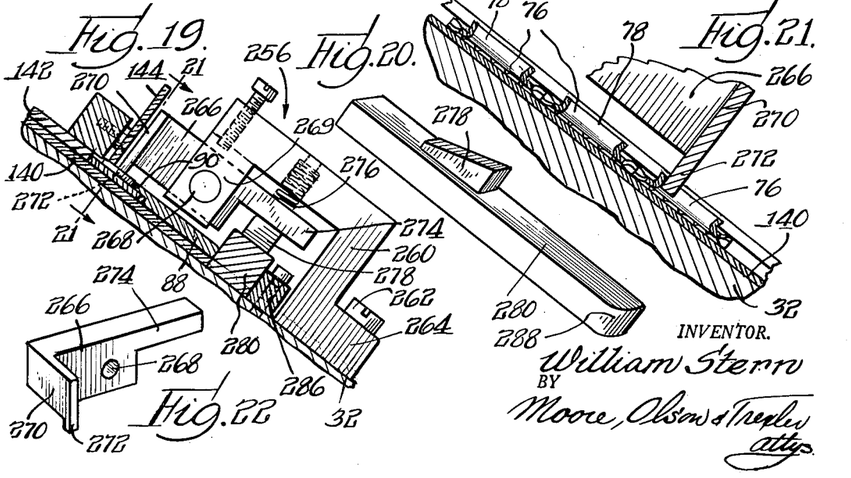
Fig. 19 is a cross-sectional view illustrating the washer release mechanism.
Fig. 20 is a perspective view of the control member of the washer release.
Fig. 21 is a longitudinal sectional view of the washer release mechanism taken substantially along the line 21—21 of Fig. 19.
Fig. 22 is a perspective view of the release lever arm of the washer release mechanism.
Figure 23:
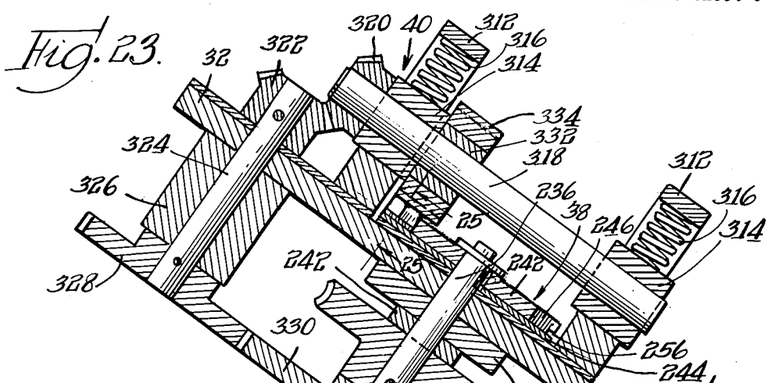
Fig. 23 is a sectional view of the washer and nut element telescoping mechanism taken along the line 23—23 of Fig. 6.

A strip 140 (see also Fig. 19) forming a part of the track or chute 36 extends downwardly from the lower edge of the plate 52 and forms a continuous upper surface therewith for supporting the washers 76 being fed down the track. This trip extends to a position adjacent the assembly wheel 38 as do the plate 88 and overlying strip 90. The chute is completed by a bar 142 spaced laterally from the plate 88 a sufficient distance to avoid contact with the washers 76 and by a cover strip 144 adjacent the bar 142 and overlying the washers positively to preclude their displacement from the surface of the supporting strip 140.

Figures 3, 5:
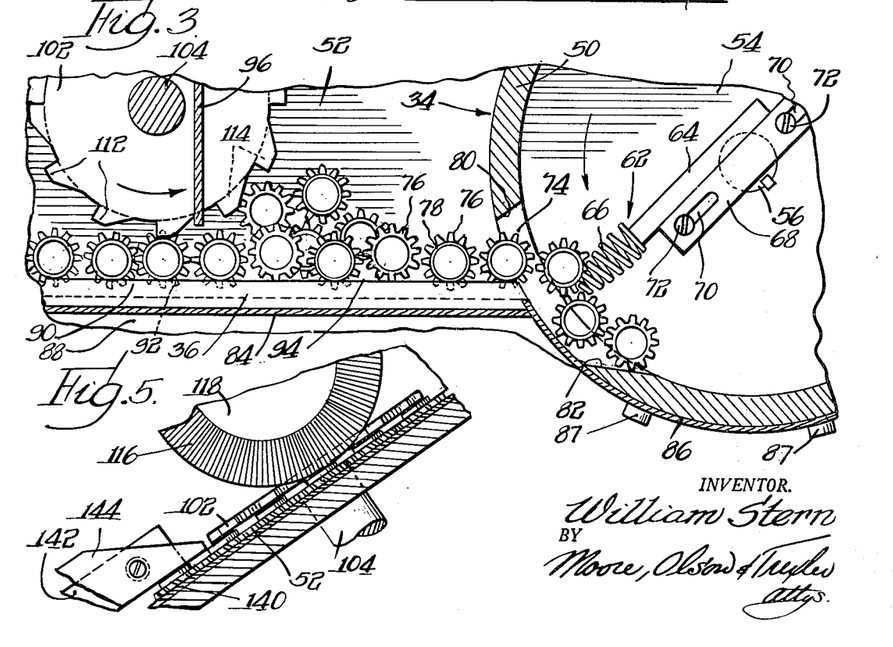
Fig. 3 is an enlarged fragmentary view partially in section taken along the line 3—3 of Fig. 2.
Fig. 5 is a sectional view taken along the line 5—5 of Fig. 4.

A ratiomotor 146 (Figs. 1, 2 and 6) is supported on a suitable bracket 148 extending from the base 30 and has a sprocket wheel 150 on its output shaft 152. A sprocket chain 154 connects the drive sprocket 150 and a driven sprocket 156 on a shaft 158 journalled in suitable bearings under the plate or table 32. A pulley wheel 160 also is fixed on the shaft 158 for rotation therewith and acts through an endless belt 162 to drive the pulley 134. This results in rotation of the wire brush 116, the clearance wheel 102, and the rotary hopper plate 54 through the drive connections heretofore described. Rotation of the plate 54 and the washer agitator 62 spreads the washers out so that they pass from the end of the spring 66 through the slot 74 as best seen in Fig. 3. Only one washer at a time can be passed through the slot 74, but a washer can pass through with the flange or rim 78 either up or down. The longitudinal inclination and transverse tilt of the track 36 due to the angular disposition of the plate or table 32, with the plane of the table at a 34° angle to the horizontal and with the transverse dimension of the table at a 35° angle with the horizontal, tends to cause the washers to engage the edge 94 and roll and slide along this edge down toward the clearance wheel 102 and wire brush 116. The washers which are properly oriented with their flanges or rims upwardly directed slide part way under the strip 90 and the flanges or rims roll along the edge 94 with the teeth free of the edge 92. The teeth of the washers which are so positioned pass through the undercut portions of the clearance wheel teeth and down the track 36, the rims continuing to roll or slide along the edge 94 with the teeth free.

Washers which are in inverted position, that is with the rims down, are engaged by the clearance wheel 102 and generally also by the wire brush 116 and are thrown back against the cylindrical drum wall 50. Any washers which may pile up are engaged by the brush 116 and thrown back against the drum wall 50. Washers which are engaged by either the clearance wheel 102 or brush 116 are flipped as they are thrown back against the drum wall and many of them will land right side up, that is with the rim or flange upwardly directed. Those landing in such position will pass on down the track while those which land upside down will be thrown back as many more times as may be necessary until they land rightside up. Eventually all of the washers discharged from the hopper will pass down the track to the assembly wheel or disc 38.

*The nut supply mechanism*

The hopper 42 (Fig. 1) is of a type well known in the art for supplying nut elements and includes a stationary casing 164 and central base plate 166. A frustoconical ring 168 is rotatably mounted between the casing 164 and plate 166 and is driven through suitable drive mechanism by a motor 170 carried by a bracket 172 upstanding from the base 30. The ring 168 is provided with a plurality of recesses 174 directed along elements of the frusto-conical surface. As is well known in the art, nut elements collect in these recesses when in the bottom part of the casing 164 and then pass from the recesses into the nut element chute 44 as the recesses reach their topmost position in the hopper. The chute 44 is supported by a block 176 upon the plate 166.

The nut elements pass through the chute 44 under the influence of gravity to the nut element selector 46. The nut elements 178 are asymmetrical, having a recess 180 in one face, i. e. the nut clamping face, as may be seen with reference to Fig. 24, for receipt of the washer flange 78. The washer flange 78 is outwardly flared and the recess 180 is of greater diameter internally of the nut than at the clamping face to retain the washer when the flange 78 is sprung into the nut recess 180. It will be appreciated that other interlocking configurations of washers and nut elements could be used and that the nut elements may be either threaded or unthreaded.

The nut element selector 46 is carried by an arm or bracket 182 upstanding from the base 30 and includes a main base or block 184 (Figs. 8–11) provided with a longitudinal groove 186 through which the nut elements pass. The chute or track 44 fits into the end of the base or block 184 and the longitudinal groove or slot 186 in the block forms a continuation of the groove or slot in the track or chute 44. A plate 188 may overlie the groove 186 adjacent the end of the track 44 if desired to insure proper positioning of the nut elements in the groove.

An arcuate slot or groove 190 is formed in the under side of the block 184 in communication with and overlapping the groove 186 and accommodates a pin wheel 192. The pin wheel comprises a circular rim or flange 194 integral with a web or plate-like portion 196. The pin wheel 192 is fixed on a shaft 198 (Fig. 1) journalled in a suitable bearing (not shown) in the arm or bracket 182. A pulley wheel 200 is fixed on the outer end of the shaft and is driven by a belt 202 looped over a pulley wheel 204 on the output shaft of a motor driven drive mechanism 206.

The pin wheel 192 is provided with a plurality of detector pins 208 (Figs. 9 to 11) set in radially extending recesses in the rim 194. The pins 208 are provided with heads 210 each having a reduced tip portion 212. The tips 212 are slightly rounded at the ends and are of proper diameter to fit just slightly into the central apertures of the nut elements 178 while the remaining portions of the heads 210 are of proper diameter to fit partly into the recesses 180 of the nut elements 178. The shoulder portions 214 of the heads are rounded off similarly to the tips 212.

A movable plate 216 overlies the groove or channel 186 slightly upwardly or upstream from the point of maximum overlapping of the grooves 186 and 190. Dowell pins 218 are fixed in the block 184 and extend upwardly through the movable plate 216, a slight amount of play being provided between the dowel pins and the plate 216. Screws or bolts 220 extend through the shiftable plate 216 with a slight amount of play and relatively near the lower edge of the plate. The screws 220 are threaded into the block 184 and coil springs 222 encircle the screws 220 and are compressed between the screw heads and the movable plate 216 to hold the plate down. The plate 216 is centrally longitudinally slotted at 224 and the lower or downstream edge of the slot is provided with a beveled corner 226.

A branch groove or channel 228 is formed in the top of the base or block 184 and branches off from the channel or groove 186. A deflector plate 230 is fixed on top of the base or block 194 and overlying the lower discharge end of the groove or channel 186. The deflector plate 230 is provided with a curved deflecting edge 232 leading into the branch channel 228. The branch channel 228 extends downwardly in the block as well as laterally as readily may be seen in Fig. 12.

Figures 8, 9, 10, 11, 12:
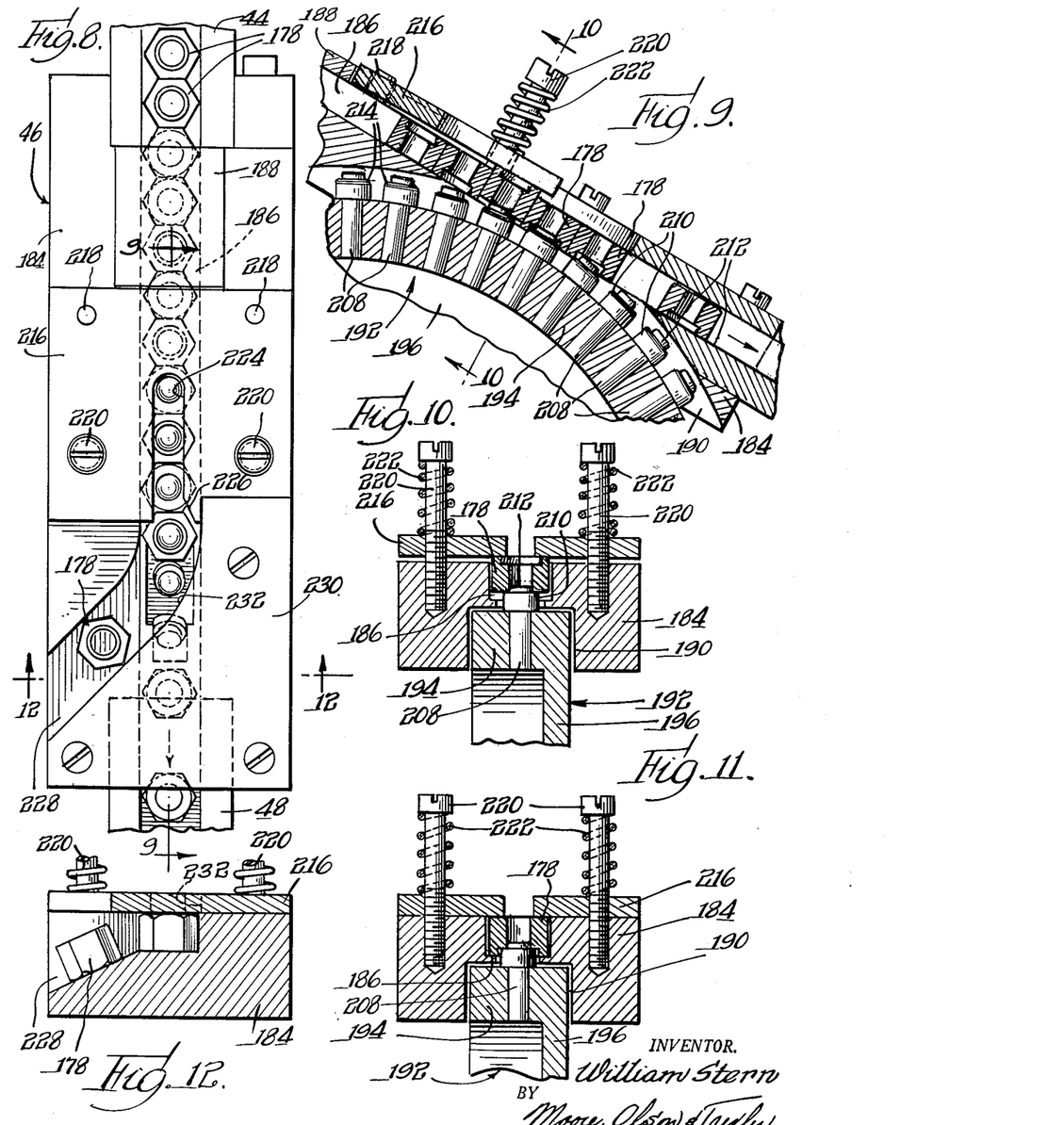
Fig. 8 is a fragmentary plan view of the nut selector mechanism.
Fig. 9 is a longitudinal sectional view of the nut selector mechanism taken substantially along the line 9—9 of Fig. 8.
Fig. 10 is a cross-sectional view taken substantially along the line 10—10 of Fig. 9.
Fig. 11 is a cross-sectional view similar to Fig. 10 showing the parts in another position.
Fig. 12 is a cross-sectional view taken substantially along the line 12—12 of Fig. 8.

As nut elements 178 slide through the channel or groove 186 they are engaged by the heads of the pins 208, the heads being appropriately spaced for engaging successive contacting nut elements. The rounded off portions of pin heads 210 extend part way into the recesses 180 and the rounded off portions of the tips 212 fit part way into the nut element bores and allow the nut elements to continue straight down the groove or channel 176 as illustrated in Fig. 11 and in the right hand portion of Fig. 9. Only the rounded off portions of the tips 212 fit within inverted nut elements as shown in Fig. 10 and in the left hand portion of Fig. 9 and raise the nut elements and shiftable plate 216 against the action of springs 222. The nut elements thus raised cannot pass under the plate 230, but instead engage the curved deflecting edge 232 and pass out through the branch channel 228 as best seen in Figs. 8 and 12 for dropping into a receptacle from which they may be returned to the hopper 42. The beveled corner 226 allows the edges of inverted nut elements to rise at that point to tip the nut elements on the pin head tips 212 to facilitate their sliding off into the branch channel 228 as they strike the deflecting edge 232. It will be understood that the pin tips 212 enter the nut element bores only far enough to overcome their friction against movable plate 216 and not far enough to prevent their being tipped off into branch channel 228. The nuts which are rightside up and are passed down the channel 196 by the pin wheel slide into the chute or track 48 which is set into the lower end of the block 184 to provide a continuation of the channel 186.

*The assembly mechanism*

A hardened plate 234 (Figs. 1, 13, and 23–25) is secured on the surface of the table 32 near the lowest corner thereof. The assembly wheel or disc 38 overlies the plate 234 and is fixed on a stub shaft 236. The shaft is journaled for rotation in the table 32, the plate 234, and a block 238 fixed to the under side of the table. A worm wheel 240 is spaced from the block 238 by a collar 241 and is pinned to the shaft to drive the same. A worm on the shaft 158 (Fig. 2) drives the worm wheel 240.

The assembly wheel or disc 38 comprises a relatively thick toothed plate 242 (Figs. 13–16 and 23) superimposed upon a relatively thin circular plate 244. The relatively thick plate 242 is provided with peripheral teeth 246 each tooth of which joins with the next tooth at the root thereof to form substantially a semicircle 248. The smoothly curved root connections 248 between the teeth actually are just short of a semicircle as they end on a circle struck from the center of the disc plate 242 and containing the centers of curvature of the curved portions 248. From this point the teeth 246 are reversely curved at 250 and are terminated in arcs 252 forming portions of a circle about the center of the plate 242. The diameter of the substantially semicircular root connections is just slightly greater than the washer diameter and the maximum nut element diameter to insure proper alignment of washers and nut elements fed into the recesses. The cutback or reversely curved portions of the teeth facilitate the insertion of washers into the recesses 254 defined by the teeth 246. The teeth 246 are peripherally undercut as at 256 to provide clearance for a detector member as will be apparent hereinafter.

A washer release mechanism 258 is provided at the lower end of the chute or track 36 for releasing washers one by one into the recesses 254 of the assembly wheel. The washer release mechanism 258 is best seen in Figs. 13, 14 and 19–22 and includes a bracket 260 secured to the table 32 by means such as screws 262 passing through ears 264 on the bracket 260 and threaded into the table 32. A lever arm 266 is pivoted at 268 between a pair of depending arms 269 on the bracket 260. The lever arm includes an angularly disposed finger 270 having a downwardly directed tip 272 for engaging within successive lock washers 76 as most particularly may be seen in Fig. 21. The arm 266 further includes a tail portion 274 held down by a coil spring 276 seated in a recess in the bracket 260. The under side of the tail 274 engages the face of a substantially wedge-shaped cam 278 mounted on a control slide 280. The control slide is urged toward the assembly wheel 38 by a coil spring 282 seated in an anchor block 284 suitably fixed to the table 32. The control slide 280 is guided by the plate 88 of the track 36 and by a guide block 286 suitably fixed to the table 32 beneath the bracket 260. The outer end of the control slide 280 is rounded off or curved at 288 for engagement with the teeth 246 of the assembly wheel. The finger tip 272 fits into the rim 78 of a washer immediately adjacent the overhead or hold-down rail or strip 144 and is raised by pivoting of the lever arm 266 under the force of spring 276 as the control slide 280 slides forwardly from one tooth to another. The released washer slides down into a recess 254, being deflected into proper position by a spring finger 290 fixed on the chute or track guide strip 142 and engaging the rims of the washers. The next washer slides into position to be arrested by the finger 272 as the slide is forced back by engagement of another tooth.

Figures 13, 14, 15, 16, 17, 18:
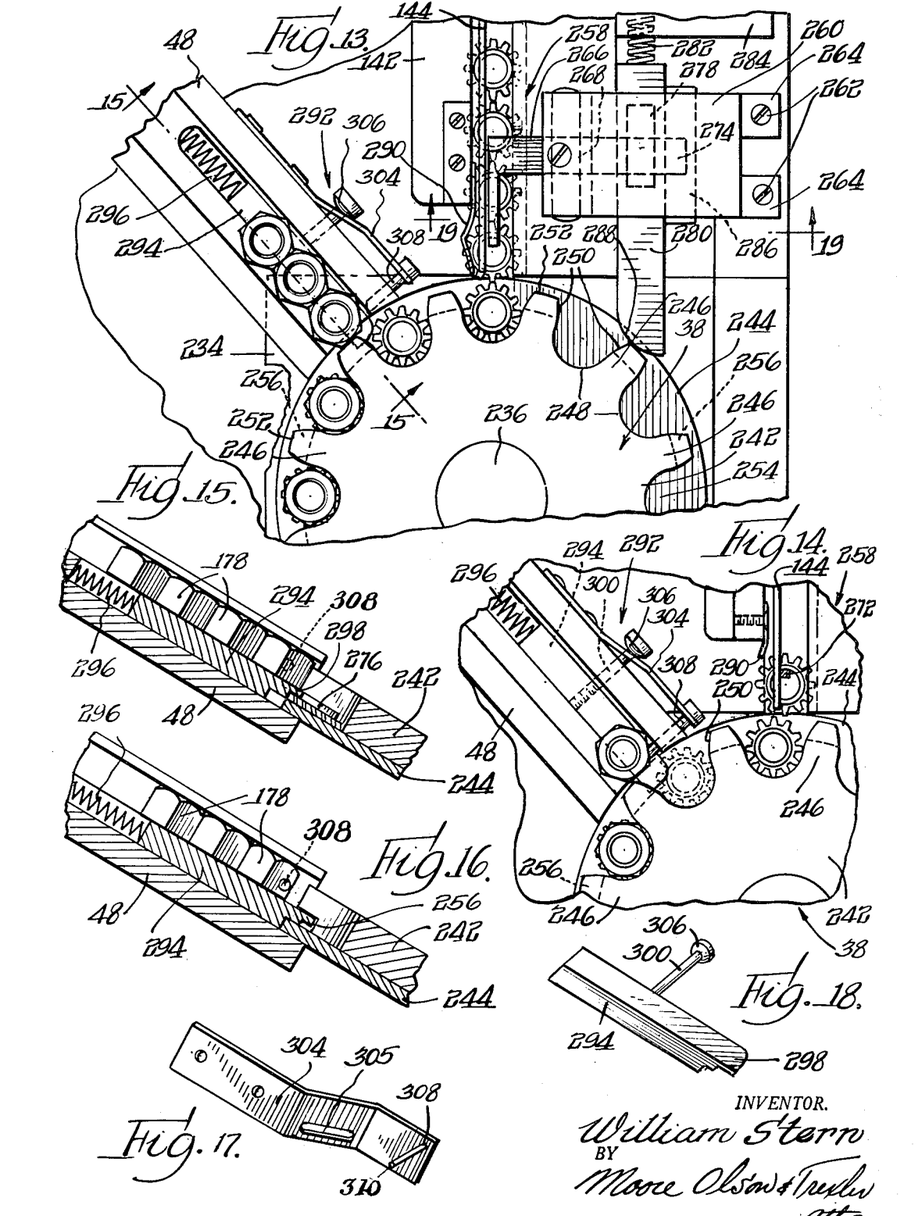
Fig. 13 is a plan view of the assembly portion of the mechanism.
Fig. 14 is a fragmentary view similar to Fig. 13 illustrating the operation of the nut release.
Fig. 15 is a longitudinal sectional view taken along the line 15—15 of Fig. 13.
Fig. 16 is a view similar to Fig. 15 showing the parts in the same position as in Fig. 14.
Fig. 17 is a perspective view of the leaf spring member of the nut release.
Fig. 18 is a perspective view of the washer detector.

The nut element supply track 48 is provided with a releasable nut mechanism 292 seen in Figs. 13–18. The nut release mechanism comprises a detector finger 294 fitting in a recess in the bottom of the central channel of the nut supply chute 48 and urged outwardly therefrom by a coil spring 296. The detector finger is provided with a rounded and recessed tip 298 fitting within the recesses 256 of the teeth 246 and adapted to engage a washer 76 as shown in Fig. 15. A headed pin 300 (Fig. 14) is screwed into the side of the detector finger 294 and extends through an elongated aperture in the side of the nut chute or track 48. A spring arm 304 is suitably secured to the side of the track 48 and has an inclined cam portion 305 provided with an elongated aperture through which the pin 300 passes. The head of the pin 300 is smoothly curved on its under side 306 for camming engagement with the spring arm 304.

The outer end of the spring arm 304 carries an escapement pin or gate member 308 having a beveled outer end 310 for engaging nut faces and thereby to restrain entry of the nuts into the assembly wheel 38 if no washers are present in the recesses 254. The detector finger 298 normally is urged forward as shown in Fig. 16 and the curved under surface 306 of the pin head cams the cam portion 305 of spring 304 and shifts the pin or gate member 308 to prevent movement of nuts into the recesses. When a washer is present in a recess it engages the curved or rounded end 298 of the detector finger and cams the finger backward against spring 296 as shown in Fig. 15. This in turn shifts the curved under surface of the pin head back along the cam portion 305 of the spring 304 so that the pin 308 is retracted to allow a nut to drop on top of a washer.

After the washer has passed the detector finger 298, the finger is free to slide forwardly again to prevent release of another nut until another washer is in position to receive the nut.

It should be noted that the reversely curved portions 250 of the teeth 246 allow passage of nuts into position in the recesses 254 while the assembly wheel is constantly moving just as the washers were allowed to move into the recesses while the disc was moving constantly.

Figure 24:
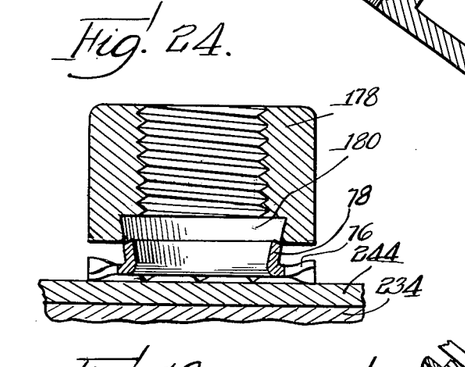
Fig. 24 is an enlarged cross-sectional view through an aligned nut element and washer prior to final telescoping.

When a nut element 178 enters a recess it rides on top of the flange 78 of the washer 76 in that recess as shown in Fig. 24. The telescoping mechanism 40 is provided to telescope the nut and washer into the final assembled relation illustrated in Fig. 25. The telescoping mechanism 40 (Figs. 1, 6, and 23) comprises brackets 312 screwed or otherwise suitably secured to the table 32 diametrically opposite one another relative to the assembly wheel 38. Bearing blocks 314 are slidably mounted in slots in the brackets and are urged down by springs 316. A shaft 318 is journaled in these bearings and is provided at one end with a bevel gear 320. The bevel gear 320 meshes with a bevel gear 322 on a shaft 324 journaled in a bearing 326 on the under side of the table 32. A gear 328 is pinned to the lower end of the shaft 324 and is driven by a gear 330 pinned on the lower end of the assembly wheel shaft 236.

Figure 25:
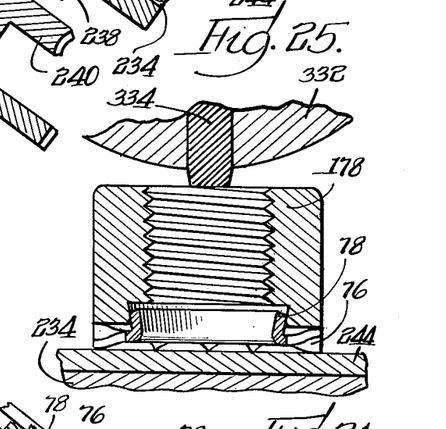
Fig. 25 is a view similar to Fig. 24 showing the telescoping of the nut element and washer as taken substantially along the line 25—25 of Fig. 23.

A telescoping roller 332 is fixed to the shaft 318 for rotation therewith, and a plurality of arcuately spaced hardened inserts 334 extend radially therefrom. The inserts are longer axially of the roller 332 than the maximum diameter of a nut 178 and are phased relative to the recesses 254 so that each insert engages the top of a nut to urge the nut down into telescoped relation with the washer as shown in Fig. 25. The spring mounting allows slight upward movement of the telescoping roller as the inserts engage the nut elements and precludes the possibility of damage to the apparatus should a defective nut element or improperly oriented nut element be engaged. The broad base afforded by the two brackets 312 and the length of the inserts 334 relative to the nut diameter insure an even pressure on the tops of nut elements so that the nut elements are forced straight down for telescoping even if they are tilted from the ideal position shown in Fig. 24. As may be seen in Figs. 24 and 25, the washer flanges 78 and nut recesses 180 are provided with cooperating bevelled edges to allow snapping of the flanges into the nut recesses.

An ejector in the form of a knife blade 336 (Figs. 1 and 6) extends over the periphery of the assembly wheel 38 and is provided with a curved leading edge 338 adapted to engage the sides of nut elements adjacent the top faces thereof to deflect the nut element and thus to eject assembled nut elements and washers from the assembly wheel whence they fall into a container 340.

It will be apparent that I have set forth herein a practical machine and method for feeding individual, flanged, toothed lock washers in succession for assembly with nut elements. The longitudinal inclination and transverse tilt of the washer feeding track or chute causes the washers to roll and slide on the rims with the teeth free, and jam-free feeding thus is obtained. The nut selecting mechanism is of simplified construction, and the telescoping mechanism positively insures proper telescoping of the washers and nut elements.

It will be apparent that the particular apparatus shown and described herein comprises only a particular example of my invention and that my invention is to include all that which falls within the spirit and scope of the appended claims.

I claim:

1. Apparatus for assembling recessed nut elements and flanged washers, the flanges being adapted to fit within the nut element recesses, said apparatus comprising a carrier disc having a plurality of outwardly opening edge recesses, a plate beneath said disc, means for supplying flanged lock washers one by one into the recesses of said disc with the washer flanges upwardly directed, means for placing recessed nut elements with the recesses down in said recesses on top of said lock washers, bearing mounts on opposite sides of said disc, bearing blocks in said mounts, spring means urging said bearing blocks downwardly, a shaft journalled in said bearing blocks, a telescoping wheel fixed on said shaft and overlying the periphery of said carrier disc for rotation with said shaft at right angles to said carrier disc axis and having a plurality of arcuately spaced peripheral protuberances of considerable axial extent relative to the maximum diameter of the nut elements and adapted to engage nut elements and force them evenly into telescoped relation with said lock washers, and means for driving said disc and said telescoping wheel in synchronous relation.

2. In an apparatus for assembling lock washers and nut elements, the combination comprising a carrier disc having a plurality of outwardly opening edge recesses for receiving lock washers and nut elements, means for supplying lock washers to said recesses, a nut element supply chute terminating substantially at the periphery of said disc, a leaf spring member on said chute, a gate member on the end of said spring member for retaining nut elements in said chute, a slide carried by said chute, spring means tending to urge said slide into the recesses of said disc, and a cam member carried by said slide and engaging said leaf spring member, said cam member coacting with said spring member to hold said gate member in nut element retaining position when the slide encounters no washer in a recess, and said cam member coacting with said spring member to retract said gate member to nut element releasing position when said slide encounters a lock washer in a recess.

3. Apparatus for feeding loose washers and nut elements comprising mechanism for supplying a succession of washers edgewise and including washer release mechanism, a rotatable disc having a plurality of outwardly opening recesses for receiving washers supplied edgewise from said release mechanism, said recesses being in part substantially semicircular and reversely curved from said semicircular part to the periphery of said disc, a control member extending from said washer release mechanism and cammed by the periphery of said disc for operating said washer release mechanism in timed relation to the movement of said disc, nut element supply means, means for releasing nut elements one by one from said nut element supply means into the recesses of said disc on top of said washers, and means for operating said nut element release means in accordance with the presence of washers in said recesses.

4. Apparatus as set forth in claim 3 wherein the washers to be fed are of a predetermined thickness, and wherein the disc in the vicinity of the recesses is substantially thicker than the predetermined thickness of the washers whereby the nut elements are received in the recesses on top of the washers.

5. Apparatus as set forth in claim 3 wherein the control member is longitudinally slidable and is spring biased toward said disc, and wherein the washer release mechanism comprises a pivotally mounted control lever having a stop portion engageable with washers to prevent passage thereof to said rotatable disc, a cam on said control member engageable with said control lever for pivoting said lever, and spring means acting on said control lever in opposition to said cam.

References Cited in the file of this patent

UNITED STATES PATENTS

| 632,125 | Kershaw | Aug. 29, 1899 |
| 711,237 | Stiker | Oct. 14, 1902 |
| 927,902 | Tyler | July 13, 1909 |
| 1,324,650 | Dunn | Dec. 9, 1919 |
| 1,606,185 | Ross | Nov. 9, 1926 |
| 1,616,641 | Tainter | Feb. 8, 1927 |
| 1,739,422 | Schmidt | Dec. 10, 1929 |
| 1,805,123 | Wilcox | May 12, 1931 |
| 1,861,889 | Stoll | June 7, 1932 |
| 1,929,146 | Lidberg | Oct. 3, 1933 |
| 1,946,820 | Stoll | Feb. 13, 1934 |
| 1,958,180 | Brackett | May 8, 1934 |
| 2,086,128 | Hackbarth et al. | July 6, 1937 |
| 2,183,600 | Werner | Dec. 19, 1939 |
| 2,192,503 | Newman | Mar. 5, 1940 |
| 2,225,654 | Olson | Dec. 24, 1940 |
| 2,321,548 | Hanneman | June 8, 1943 |
| 2,350,486 | Bailey | June 6, 1944 |
| 2,424,208 | Poupitch | July 15, 1947 |
| 2,500,376 | Pellow et al. | Mar. 14, 1950 |
| 2,542,357 | Reed | Feb. 20, 1951 |

FOREIGN PATENTS

| 519,563 | Great Britain | Mar. 29, 1940 |